US010929305B2

(12) United States Patent
Chen et al.

(10) Patent No.: US 10,929,305 B2
(45) Date of Patent: Feb. 23, 2021

(54) PAGE SHARING FOR CONTAINERS

(71) Applicant: INTERNATIONAL BUSINESS MACHINES CORPORATION, Armonk, NY (US)

(72) Inventors: Qin Yue Chen, Shanghai (CN); Chao Jun Wei, Beijing (CN); Han Su, Shanghai (CN); Fei Fei Li, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 16/274,410

(22) Filed: Feb. 13, 2019

(65) Prior Publication Data
US 2020/0257634 A1     Aug. 13, 2020

(51) Int. Cl.
*G06F 12/1009*     (2016.01)
*G06F 9/54*     (2006.01)
(Continued)

(52) U.S. Cl.
CPC ........ *G06F 12/1009* (2013.01); *G06F 9/5077* (2013.01); *G06F 9/544* (2013.01); *H04L 67/1008* (2013.01); *G06F 2009/45583* (2013.01); *G06F 2212/152* (2013.01); *G06F 2212/463* (2013.01)

(58) Field of Classification Search
CPC ....... H04L 67/1008; G06F 2009/45583; G06F 12/1009
See application file for complete search history.

(56) References Cited

U.S. PATENT DOCUMENTS 6,789,156 B1 *  9/2004  Waldspurger ....... G06F 12/1018
                                                            711/6
7,500,048 B1 *  3/2009  Venkitachalam ..... G06F 12/109
                                                            711/6
(Continued)

FOREIGN PATENT DOCUMENTS

CN        106815057 A    6/2017

OTHER PUBLICATIONS

Garg, et al., "Catalyst: GPU-assisted rapid memory deduplication in virtualization environments", VEE '17, Apr. 8-9, 2017, Xi'an, China, Copyright 2017 ACM, DOI: http://dx.doi.org/10.1145/3050748.3050760, pp. 44-59.

(Continued)

*Primary Examiner* — Lashonda T Jacobs
(74) *Attorney, Agent, or Firm* — Kenneth Han

(57) ABSTRACT

This disclosure provides methods, systems and computer program products for page sharing among a plurality of containers running on a host. The method comprises in response to a first container accessing a first file not cached by the first container, checking whether a second file equivalent to the first file is shared in a memory of the host by a second container, wherein the checking is based on a record in which related information of at least one shared file is stored. The method further comprises in response to the checking indicating there is no second file, allocating in the memory at least one page for the first file, loading the first file into the at least one page, and storing related information of the first file into the record.

20 Claims, 6 Drawing Sheets

(51) Int. Cl.
  *G06F 9/50* (2006.01)
  *H04L 29/08* (2006.01)
  *G06F 9/455* (2018.01)

(56) References Cited

U.S. PATENT DOCUMENTS

| | | | |
|---|---|---|---|
| 7,620,766 | B1 | 11/2009 | Waldspurger |
| 7,827,201 | B1* | 11/2010 | Gordon ................ G06F 16/289 707/792 |
| 7,870,536 | B2* | 1/2011 | Banavar ................... G06F 8/20 717/100 |
| 7,925,850 | B1 | 4/2011 | Waldspurger ......... G06F 9/4856 711/162 |
| 8,423,956 | B2* | 4/2013 | Banavar .................... G06F 8/20 717/120 |
| 8,706,947 | B1 | 4/2014 | Vincent |
| 8,938,572 | B1 | 1/2015 | Vincent |
| 10,216,529 | B1* | 2/2019 | Makhov ................ G06F 9/4411 |
| 10,223,276 | B2* | 3/2019 | Tsirkin .................. G06F 3/0647 |
| 10,318,180 | B1* | 6/2019 | Benhanokh .......... G06F 12/0246 |
| 10,474,568 | B2* | 11/2019 | Wang .................. G06F 12/1009 |
| 10,705,914 | B2* | 7/2020 | Zhao ................... G06F 11/1458 |
| 2008/0127182 | A1* | 5/2008 | Newport ............. G06F 12/1054 718/1 |
| 2009/0187729 | A1* | 7/2009 | Serebrin ................. G06F 9/455 711/206 |
| 2010/0031086 | A1* | 2/2010 | Leppard .............. G06F 11/1662 714/15 |
| 2010/0325500 | A1* | 12/2010 | Bashir ................ G06F 11/1612 714/746 |
| 2011/0225243 | A1* | 9/2011 | Almeida ................... G06F 9/52 709/205 |
| 2012/0131259 | A1 | 5/2012 | Baskakov et al. |
| 2016/0098285 | A1* | 4/2016 | Davis .................. G06F 9/45558 718/1 |
| 2017/0054759 | A1* | 2/2017 | Lee ........................ G06F 21/577 |
| 2017/0357592 | A1 | 12/2017 | Tarasuk-Levin et al. |
| 2018/0059956 | A1 | 3/2018 | Tsirkin et al. |
| 2018/0121649 | A1* | 5/2018 | Folco .................... G06F 21/554 |
| 2019/0121541 | A1* | 4/2019 | Zhao ..................... G06F 3/0664 |
| 2019/0235906 | A1* | 8/2019 | Asawa ................... G06F 9/4875 |
| 2019/0317843 | A1* | 10/2019 | Zhao ..................... G06F 11/301 |
| 2019/0324676 | A1* | 10/2019 | Bensberg ............... G06F 3/0604 |
| 2019/0370113 | A1* | 12/2019 | Zhao ....................... G06F 9/545 |
| 2020/0250087 | A1* | 8/2020 | Bono .................. G06F 9/45558 |

OTHER PUBLICATIONS

Mell et al., "The NIST Definition of Cloud Computing", Recommendations of the National Institute of Standards and Technology, Special Publication 800-145, Sep. 2011, 7 pages.

http://millennialmainframer.com/2015/03/yes-use-ibm-mainframes-reliable-secure-memory/, "Yes, We Use IBM Mainframes for Reliable and Secure Memory", Posted on Mar. 10, 2015, 8 pages.

Seaborn et al., "Exploiting the DRAM rowhammer bug to gain kernel privileges", How to cause and exploit single bit errors, Mar. 9, 2015, 72 pages.

* cited by examiner

PAGE SHARING FOR CONTAINERS

BACKGROUND

The present invention relates to memory management in a network service environment, and more specifically, to computer-implemented methods, systems and computer program products for page sharing in multi-container environment.

In the Infrastructure-as-a-Service model (IaaS), multiple virtual machines (VMs) run independently but are collocated on a single physical host server and the available physical memory of the host are partitioned among VMs. Content-based page sharing (CBPS) technology can make duplicated blocks of memory (or pages) to be collapsed into a single physical copy, then all duplicate virtual pages may point to the single physical page so as to reduce utilized memory space. This adjustment means that redundant physical pages can be freed, and the memory footprint of the application or OS may be lowered. Two implementation examples of CBPS are Kernel Samepage Merging (KSM) and Transparent Page Sharing (TPS), and both of these two technologies may scan pages periodically, compare page content and remove duplicate pages.

SUMMARY

Disclosed herein are embodiments of methods, systems and computer program products for page sharing in multi-container environment.

According to one embodiment of the present invention, there is provided a computer implemented method for page sharing among a plurality of containers running on a host. The method comprises in response to a first container accessing a first file not cached by the first container, checking whether a second file equivalent to the first file is shared in a memory of the host by a second container, wherein the checking is based on a record in which related information of at least one shared file is stored. The method further comprises in response to the checking indicating there is no second file, allocating in the memory at least one page for the first file, loading the first file into the at least one page, and storing related information of the first file into the record. The method further comprises in response to the checking indicating there is the second file, accessing at least one page for the second file in the memory of the host.

According to another embodiment of the present invention, there is provided a system for page sharing among a plurality of containers running on a host. The system may include a computer processor coupled to a computer-readable memory unit, said memory unit comprising instructions that when executed by the computer processor implements the above method.

According to a further embodiment of the present invention, there is provided a computer program product for page sharing among a plurality of containers running on a host. The computer program product comprises a computer readable storage medium having program instructions embodied therewith. When executed on one or more processors, the instructions may cause the one or more processors to perform the above method.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
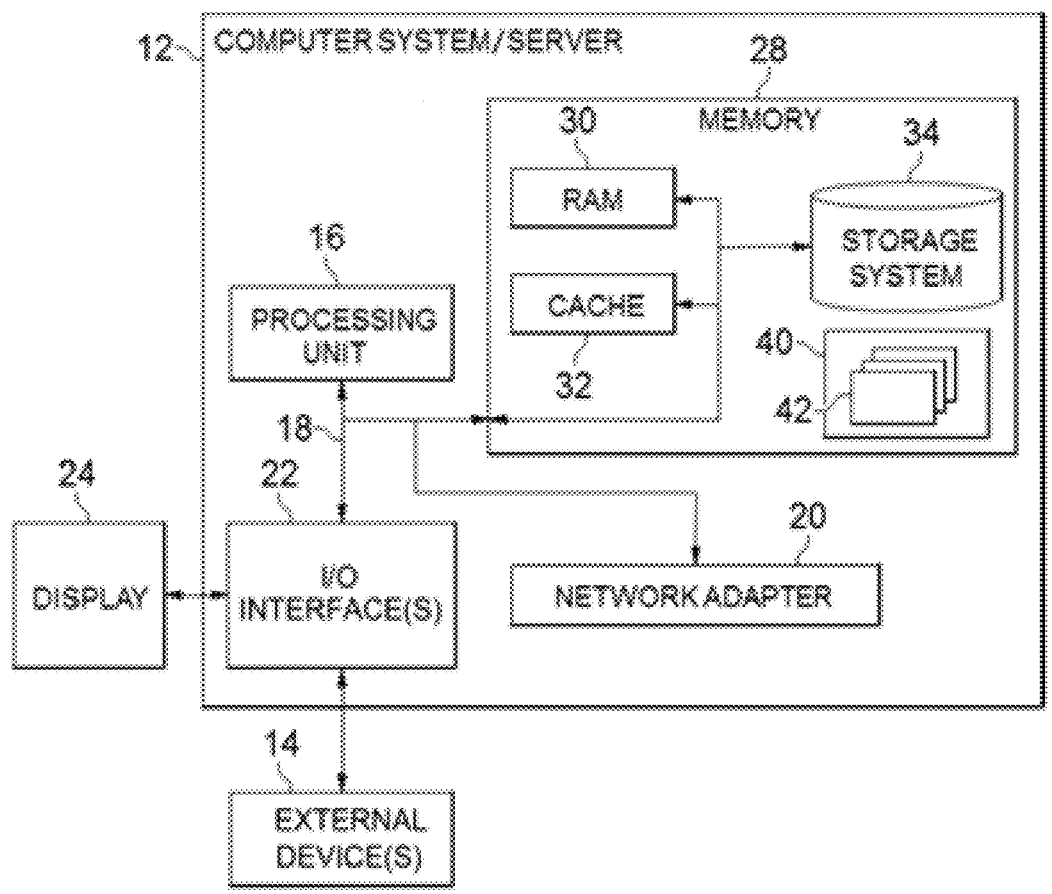
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
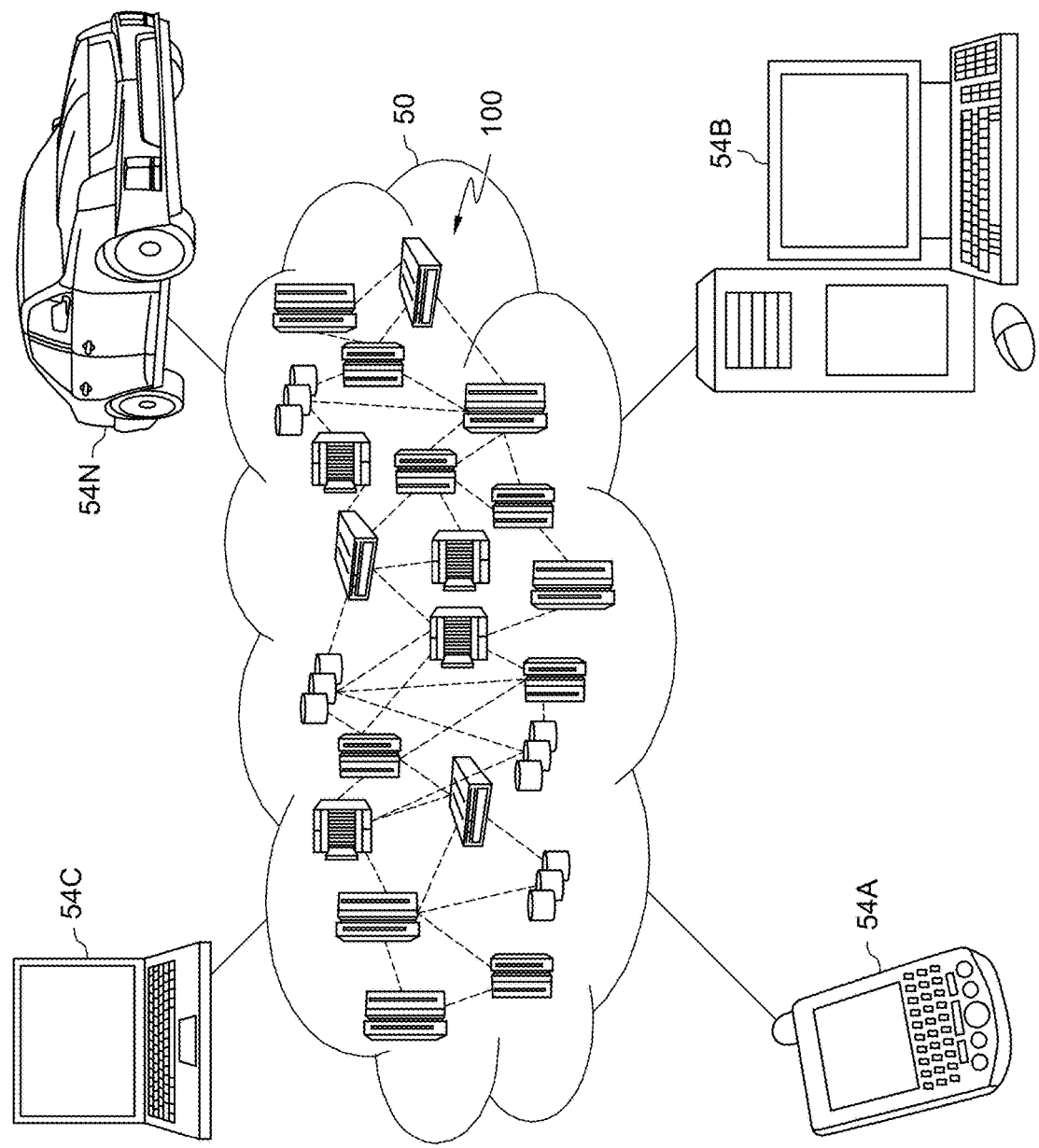
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
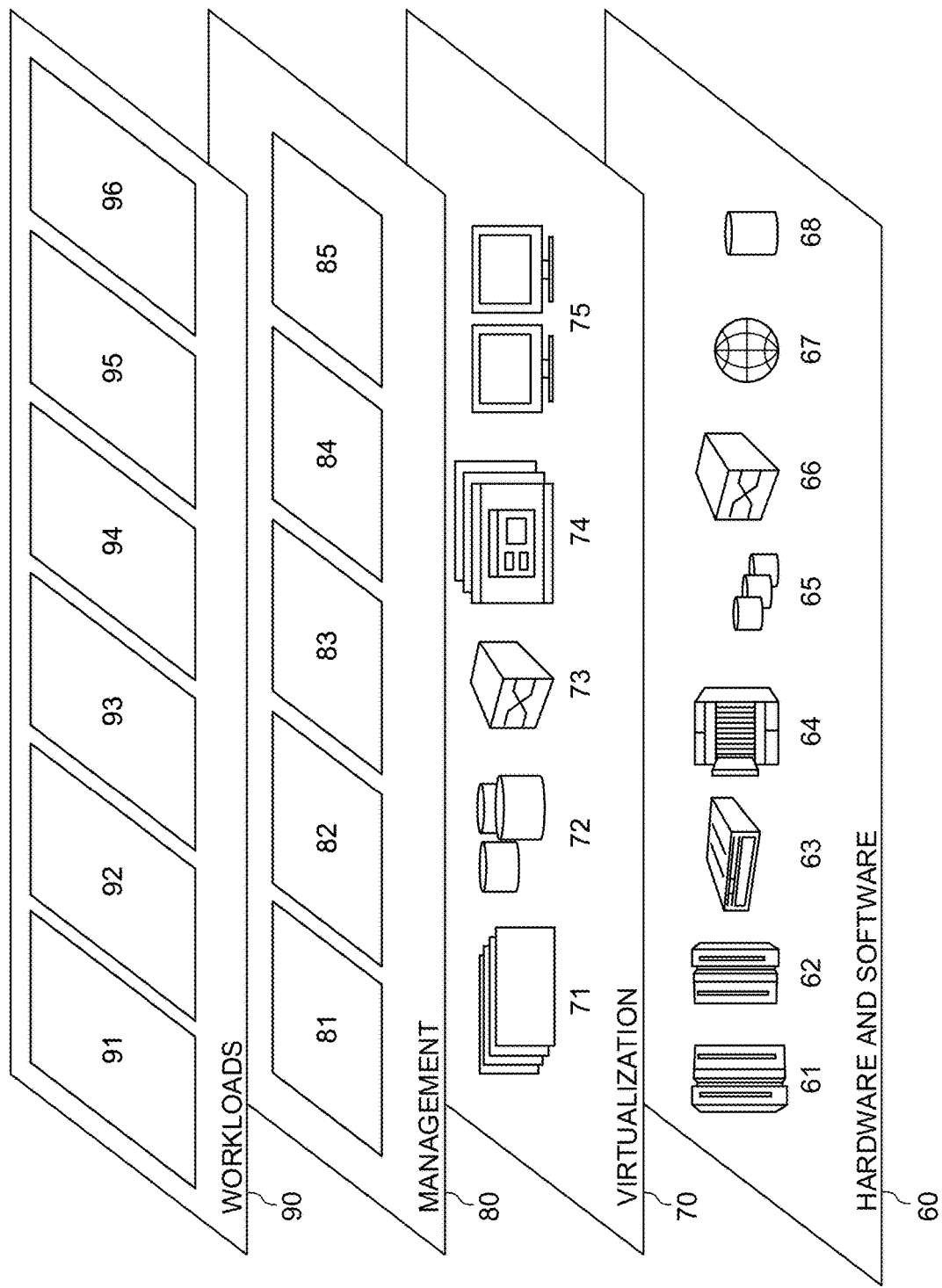
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and page sharing management 96.

In multi-container environment, multiple containers accessing the same file may share a single page cache entry for that file. Existing implementations of CBPS, e.g. KSM and TPS, need to scan shared pages in the memory periodically, compare page content block by block and remove duplicate pages, which may result in big processor overhead and may be less efficient.

Another problem is that page cache sharing does not work for containers using separate file systems. In addition, existing CBPS technology such as TPS and KSM may have very high performance overhead to each container due to so many containers run on one host. Additionally, containers keep being created and destroyed and memory keeps paging in and paging out, which may cause that KSM or TPS cannot get to the balanced level and CPU utilization may be very high.

The inventors of the present invention also found some potential security risks in KSM such as privacy exposure risk. For example, KSM is vulnerable to cross VM cache timing attack or row hammer attack due to its mechanism.

Therefore, there is a need for a method for page sharing applicable to a multi-container environment with low overhead and high security. A method for de-duplicating memory pages for containers is proposed in this disclosure, which relies on the nature of container images instead of page block-by-block comparison on-line in CBPS to minimize CPU overhead and privacy exposure risk.

Figure 4:
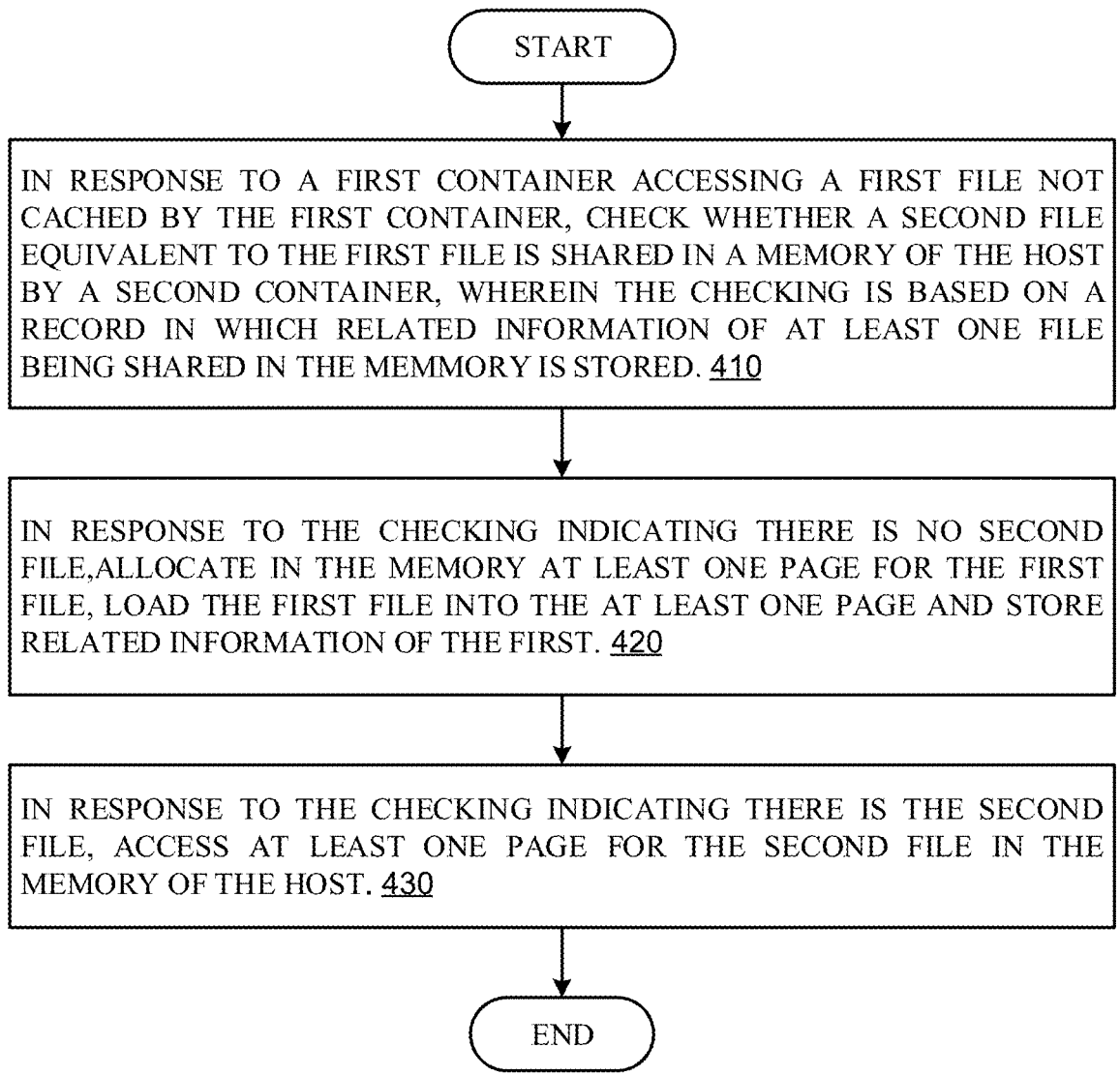
FIG. 4 is a flowchart illustrating an exemplary method for page sharing in multi-container environment according to an embodiment of the present invention.

FIG. 4 is a flowchart illustrating an exemplary method 400 for page sharing in multi-container environment according to an embodiment of the present invention. It would be appreciated that, the method in FIG. 4 can be implemented in various systems, such as the computer system/server 12 in FIG. 1, or a computing node in the cloud computing environment 50 in FIG. 2.

As shown in FIG. 4, at step 410, in response to a first container in a host accessing a first file which is not cached by the first container, the present invention checks whether a second file equivalent to the first file is shared in a memory of the host by a second container, wherein the checking is based on a record in which related information of at least one file being shared in the memory is stored. Both the first container and the second container may run on a host or on a virtual machine on the host. The first container may use a first file system, and the second container may use a second file system, wherein the second file system is the same as or different from the first file system.

In one embodiment of the invention, when the first container intends to access the first file, a corresponding page access event can be generated, which can be monitored by a monitoring thread, or process, running on the host (or a VM if the first container runs on the VM). If the first file is (i) not cached by the first container, which means the first file is not in the host memory that has been allocated to the first container, and (ii) if the first file is from an image, then a file path of the first file is sent to a host extension. A host extension is a thread or process running on the host which may implement functions of the present invention. The host extension can check a record from the perspective of host to check whether a second file which is equivalent to the first file is shared in the memory of the host by a second container on the host. In one embodiment, the record is a data structure (such as a table, an XML file, and etc.) maintained by the host extension. The record may include an entry for each file being shared. Each entry may include at least the following information: an image ID of a source image of the file, a file path of the file (including its filename), and information that can be used to address at least one page of a file in the memory of the host. The record may adopt another data structure as long as it can represent the above information.

In one embodiment of the invention, the record may be in the form of a table such as Table 1.

TABLE 1

| Image ID | File Path | Page Index | Total Number of Pages |
|---|---|---|---|
| IA | /usr/lib/f2 | 0x8204A371 | 50 |
| IC | /bin/fx | 0x101121AE | 18 |
| ... | ... | ... | ... |

In Table 1, at least four types of information items of a file being shared are shown, i.e., an image ID, a file path, a host physical page index in the host memory and total number of pages, i.e., the number of pages allocated for the file are stored in one entry. Page index is the address of the initial page in the memory the file. Those skilled in the art may understand that the host physical page index in the host memory and the number of pages allocated for the file can be used to address the file in the memory of the host. On the other hand, based on the image ID and the file path of the file in each entry of the Table 1, whether a second file equivalent to the first file is shared in the memory by a second container can be checked. The detail implementation will be described in another part of the description.

At step 420, in response to the checking indicating there is no second file, at least one page for the first file can be allocated in the memory of the host, and the first file can be loaded into the allocated at least one page. Here, the first file comes from an image from which the first container is created. When the first container is created by this image, the first file is mounted from the image to the first file system. In other words, if information about the first file, or a second file equivalent to the first file, cannot be found in the record, which means the first file or the second file is not currently shared by other containers, then the first file should be loaded from the first file system. In one embodiment of the invention, for example, if the first file is "/usr/lib/f1" (here, f1 is the file name of the first file) and it cannot be found in Table 1, then the first file is loaded from the first file system and written to pages in the host memory that are newly allocated to the first container. Now, the first file is cached by the first container and the first container can use these pages to fulfill its accessing attempt for the first file.

At step 420, related information of the first file is stored in the record. For example, if the first file is "/usr/lib/f1" and is newly loaded into the memory, a new entry can be added to Table 1 to indicate that "/usr/lib/f1" can be shared in the memory. The Table 1 added with the new record (i.e., the first record) is shown below as Table 2.

TABLE 2

| Image ID | File Path | Page Index | Total Number of Pages |
|---|---|---|---|
| IA | /usr/lib/f1 | 0x6067D25B | 35 |
| IA | /usr/lib/f2 | 0x8204A371 | 50 |
| IC | /bin/fx | 0x101121AE | 18 |
| ... | ... | ... | ... |

At step 430, in response to the result of the checking showing that the second file is equivalent to the first file and the second file is shared in the memory, e.g. the result of the checking is positive, at least one page for the second file in the memory of the host is accessed. That is, instead of allocating new pages to the first container and loading the first file from its file system to these new pages, the first container can directly use pages of the second file in the memory to fulfill the accessing attempt for the first file. The pages of the second file can be located in the memory by looking up addresses of these pages in the record. For example, in Table 2, the columns of Page Index and Page number indicate the addresses of the pages of a shared file, e.g. the second file mentioned above. By doing so, memory pages can be de-duplicated based on nature of container images instead of page block-by-block comparison.

In the above embodiment, files are equivalent if they come from the same image and have the same file path. However, sometimes, equivalent files may come from different images. In another embodiment of the invention, the first container is created from a first image, and the second container is created from a second image that is different from the first image. The first file comes from the first image when the first container is created, and the second file comes from the second image when the second container is created. In this case, the first file is equivalent to the second file in the case that the first file and the second file are in the same layer of respective image and have the same file path or in the case that the first file and the second file have the same file content.

According to an embodiment of the invention, the first image may include one or more layers, which are stacked on each other. When the first container is created from the first image, a new writable layer may be added on top of the underlying layers of the first image. All changes made to the first container may be written to the writable layer. A file in an upper layer of an image may override the file with the same file name in a lower layer of the image. That is to say, if a file may be found in multiple layers of an image, the file in the highest layer of the multiple layers is the file loaded by the container. Files in different layers of the multiple layers are not equivalent.

In another embodiment of the invention, the record may further include an equivalency relationship among files. In an embodiment of the invention, the equivalency relationship among files may be determined by a preceding scan on images. By performing a scan on the first image (image ID=IA) and the second image (image ID=IC), file equivalency relationship can be stored in the above Table 2 or a separate table such as the following Table 3.

TABLE 3

| Image ID1 | File Path1 | Image ID2 | File Path2 |
|---|---|---|---|
| IA | /usr/lib/f1 | IC | /usr/lib/f1 |
| IA | /usr/lib/fb | IC | /usr/lib/fc |

For example, in the first row of Table 3, the file "/usr/lib/f1" is in both of images IA and IC. If "/usr/lib/f1" in the image IA and "/usr/lib/f1" in the image IC are in the same layer, then the two files are determined to be equivalent without the need of content comparison. In this case, to facilitate the table looking up, the scan result can be added into the above Table 2 as follows for example in the case that the file "/usr/lib/f1" is being shared.

TABLE 4

| Image ID | File Path | Page Index | Page Number |
|---|---|---|---|
| IA, IC | /usr/lib/f1 | 0x6067D25B | 35 |
| IA | /usr/lib/f2 | 0x8204A371 | 50 |
| IC | /bin/fx | 0x101121AE | 18 |
| ... | ... | ... | ... |

For example, in an embodiment, in the second row of Table 3, even two files have different file paths, by performing content comparison in the scan, they also can be determined to be equivalent. As data in images are static, a single scan is enough to collect all the information needed to form a complete file equivalency table for a whole system like Table 3. The information can be saved for persistent usage and all cloud nodes can benefit from it.

In another embodiment of the invention, the method in FIG. 4 may further comprise: before checking based on the record, whether the first file was modified in the first container is determined; and before checking based on the stored relationship, whether the second file was modified in the second container is determined. Only if it is determined a file has not been ever modified, the record can be checked for this file. In one embodiment, a list including files that have ever been modified can be maintained for each container. Each time a file is to be accessed, mechanism in FIG. 4 can be used only if the file is not in the list. According to this embodiment, only read-only files become targets to be shared, and files modified by containers are not considered as targets to be shared. By doing so, timing attack potential risk is eliminated, and the security of the system is improved.

More details about the method in FIG. 4 will be illustrated in connection with FIGS. 5 and 6.

Figure 5:
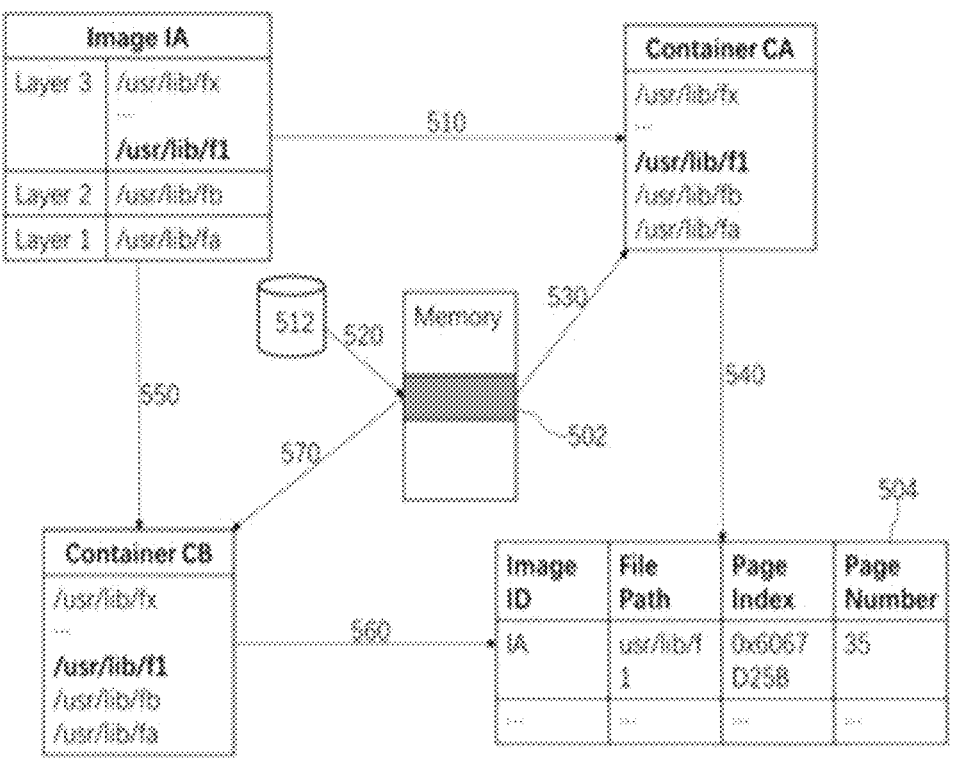
FIG. 5 is a schematic diagram illustrating an exemplary method for page sharing in multi-container environment according to an embodiment of the present invention.

FIG. 5 is a schematic diagram illustrating an exemplary method for page sharing in multi-container environment according to an embodiment of the present invention.

With reference to FIG. 5, in this example, there are two containers CA and CB, both created from the same image IA.

At step 510, the container CA starts from the image IA, and valid files in image IA are mounted to the file system 512 used by container CA. During the operation of the container CA, the container CA tries to access a file "/usr/lib/f1" from the image IA and finds this file is not in memory allocated to the container CA. If this file has not ever been modified by the container CA, the table 504 is checked to see if the file "/usr/lib/f1" from the image IA is being shared. Assuming that, at this moment, this file from the image IA cannot be found in any entry in the table 504.

Then, at step 520, new pages 502 are allocated to the container CA in the memory and the file "/usr/lib/f1" is loaded from the file system 512 into pages 502. Next, at step 530, content of pages 502 are used by the container CA to fulfill the access operation. At step 540, image ID and file path of the file and memory location of the file are stored in the table 504 so that other containers to access this file can find its location in the memory.

One the other hand, at step 550, container CB starts from the image IA and valid files in image IA are mounted to the file system (not shown in FIG. 5) used by the container CB, which is separate from the file system 512. During the operation of the container CB, the container CB tries to access a file "/usr/lib/f1" and finds this file is not in memory allocated to the container CB. At step 560, if this file has not ever been modified by the container CB, the table 504 is checked to see if the file "/usr/lib/f1" from the image IA is being shared. It can be found from the table 504 that, there is an entry including an image ID of "IA" and a file path of "/usr/lib/f1". That is, this file is being shared by another container. Thus, instead of allocating new pages to the container CB, based on information in the table 504 (i.e., page index and page number of the file), the container CB directly uses pages 502 in the memory to fulfill its access operation at step 570.

In the above embodiment, containers CA and CB are running on the same host but use separate file systems, or they may be running on two different VMs on the same host. For some steps in FIG. 5, they are not necessary to be performed in the shown order. For example, steps 510 and 550 can be performed in a reversed order or in parallel, and steps 530 and 540 can be performed in a reversed order or in parallel.

Figure 6:
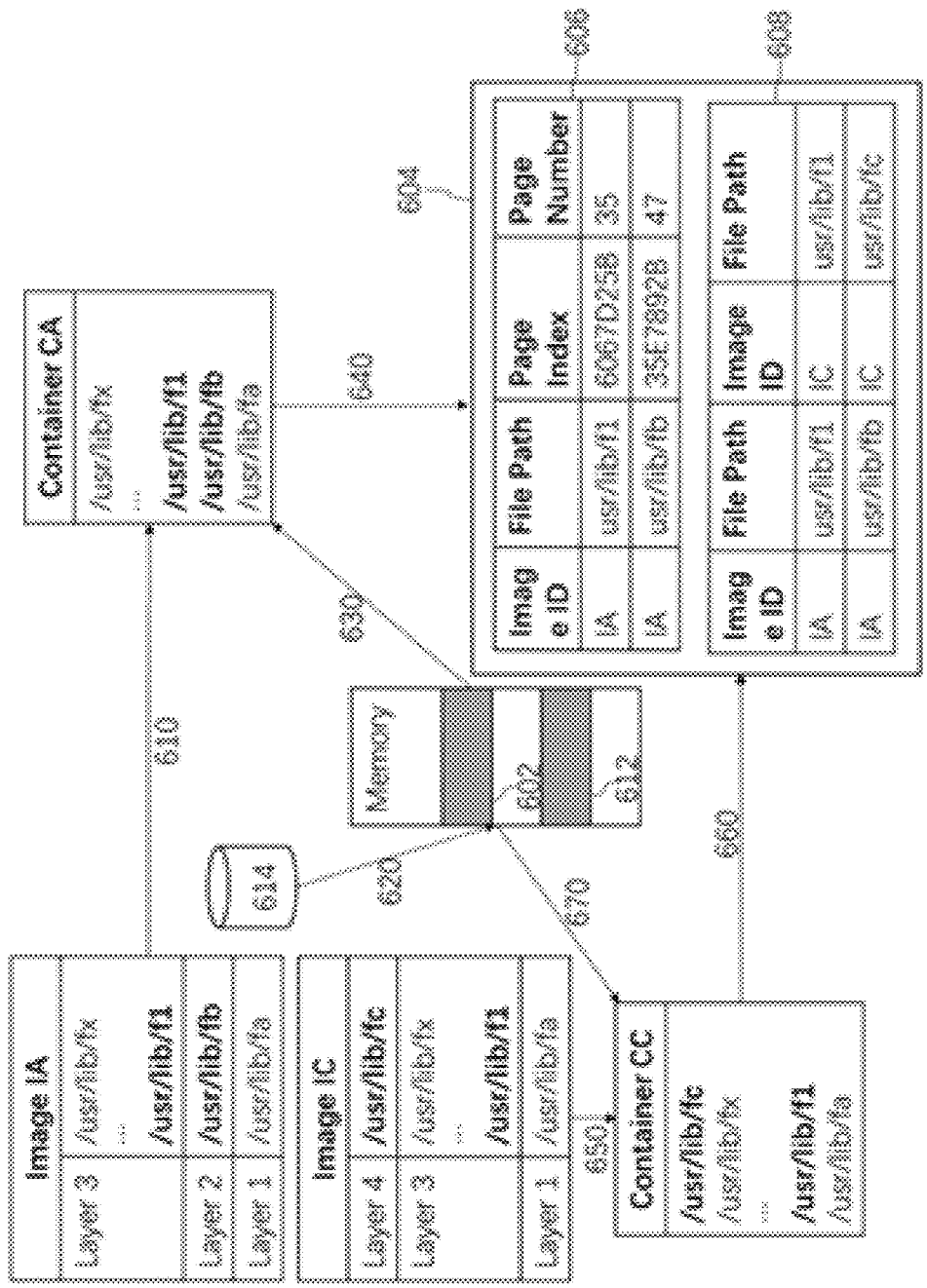
FIG. 6 is a schematic diagram illustrating another exemplary method for page sharing in multi-container environment according to an embodiment of the present invention.

FIG. 6 is a schematic diagram illustrating another exemplary method for page sharing in multi-container environment according to an embodiment of the present invention.

With reference to FIG. 6, in this example, there are two containers CA and CC, which are created from different images IA and IC.

At step 610, the container CA starts from the image IA, and valid files in image IA are mounted to the file system 614 used by the container CA. During the operation of the container CA, the container CA tries to access a file "/usr/lib/f1" from the image IA and finds this file is not in memory allocated to the container CA. If this file has not ever been modified by the container CA, the record 604 is checked to see if the file "/usr/lib/f1" from the image IA is being shared. Here, in this embodiment, a file is not being shared means that, there is no entry in the table 606 involving this file and there is no entry in the table 608 involving another file equivalent to this file. File equivalency relationship is created in advance by scanning images and is stored in the table 608. Assuming that, at this moment, this file "/usr/lib/f1" from the image IA is not being shared.

Then, at step 620, new pages 602 are allocated to the container CA in the memory and the file "/usr/lib/f1" is loaded from the file system 614 into pages 602. Next, at step 630, content of pages 602 are used by the container CA to fulfill the access operation. At step 640, an image ID, a file path of the file, and memory location of the file are stored in the table 606 so that other containers to access this file can find its location in the memory.

One the other hand, at step 650, container CC starts from the image IC and valid files in image IC are mounted to the file system (not shown in FIG. 6) used by the container CC, which is separate from the file system 614. During the operation of the container CC, the container CC tries to access a file "/usr/lib/f1" from the image IC and finds this file is not in memory allocated to the container CC. At step 660, if this file has not been ever modified by the container CC, the record 604 is checked to see if the file "/usr/lib/f1" from the image IC is being shared. Though an entry including a file path of "/usr/lib/f1" can be found and an image ID of "IC" cannot be found in the table 606, a file equivalent to this file is found in the table 608, i.e., "/usr/lib/f1" from the image IA, where the table 608 is generated by a preceding scan on images. It can be found from the table 606 that, there is an entry including an image ID of "IA" and a file path of "/usr/lib/f1". That is, this file is being shared by another container. Thus, instead of allocating new pages to the container CC, based on information in the table 606 (i.e., page index and page number of the file), the container CC can directly access pages 602 in the memory to fulfill its access operation at step 670.

In the above example, "/usr/lib/f1" from the image IA and "/usr/lib/f1" from the image IC are deemed being equivalent because they have the same file path and in the same layer and have not been ever modified. In another example in FIG. 6, "/usr/lib/fb" from the image IA and "/usr/lib/fc" from the image IC can also be deemed as being equivalent by file content comparison during scanning images even if they have different file paths. Assuming that the two files have the same content as a result of file comparison, their equivalency relationship is stored in the table 608 as shown in FIG. 6. Similar to page sharing between the containers CA and CC for the file "/usr/lib/f1", memory pages 612 are only allocated to the container CA to accommodate the file "/usr/lib/fb" loaded from the file system 614. When the container CC intends to access its file "/usr/lib/fc", it can find that a file "/usr/lib/fb" from the image IA is equivalent to "/usr/lib/fc", whose address information in the table 606 can be used to directly use content of pages 612 for the access operation, thus allocating new pages for the container CC is not needed.

In the above embodiment, containers CA and CC may run on two different VMs and the two different VMs may run on the same host, or containers CA and CC may run on the same host. For some steps in FIG. 6, they are not necessary to be performed in the shown order. For example, steps 610 and 650 can be performed in a reversed order or in parallel, and steps 630 and 640 can be performed in a reversed order or in parallel.

According to embodiment of the invention, advantages of page sharing can be obtained for containers using separate file systems. Additionally, compared with traditional CBPS, as no content block-by-block comparison is needed, CPU overhead is lowered greatly. Further, in one embodiment of the invention, since page sharing are only performed with respect to read-only files, the timing attack potential risk is reduced.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for page sharing among a plurality of containers running on a host, comprising:
   in response to a first container requesting access to a first file not cached by the first container,
      checking, by one or more processors, whether a second file equivalent to the first file is shared in a memory of the host by a second container, wherein the checking is based on a first record in which related information of at least one shared file is stored;
   in response to the checking indicating there is no second file,
      allocating, by one or more processors, in the memory at least one page;
      loading, by one or more processors, the first file into the at least one page; and
      storing, by one or more processors, related information of the first file into the record; and
   in response to the first container requesting access to a third file not cached by the first container, checking, by one or more processors, whether a fourth file equivalent to the third file is shared in a memory of the host by the second container, wherein the checking is based on a second record in which related information of at least one shared file is stored;
   in response to the checking indicating there is the fourth file,
      accessing, by one or more processors, a plurality of pages of the fourth file in the memory to fulfill the accessing attempt for the third file, wherein the plurality of pages of the fourth file are found in the memory by looking up a respective plurality of addresses of the pages in the second record.

2. The method of claim 1, wherein the related information of the at least one shared file includes an image ID of a source image of the shared file, a file path of the shared file, and information used to address at least one page of the shared file in the memory.

3. The method of claim 2, wherein the checking further comprises:
   determining, by one or more processors, that the second file is equivalent to the first file when the first container and the second container are created from the same image, and the first file and the second file have the same file path.

4. The method of claim 2, wherein the checking further comprises:
   determining, by one or more processors, that the second file is equivalent to the first file when the first container and the second container are created from two different images, the first file and the second file come from the two different images respectively, and the first file and the second file are in the same layer of respective images and have the same file path.

5. The method of claim 2, wherein the checking further comprises:

determining, by one or more processors, that the second file is equivalent to the first file when the first container and the second container are created from two different images, the first file and the second file come from the two different images respectively, and the first file and the second file have the same file content.

6. The method of claim 1, further comprising:
determining, by one or more processors, that the first file and the second file have not been modified in respective containers before the checking.

7. The method of claim 1, wherein the first container and the second container use separate file systems.

8. A system for page sharing among a plurality of containers running on a host, the system comprising:
one or more processors;
a memory coupled to at least one of the processors;
a set of computer program instructions stored in the memory and executed by at least one of the processors, the computer program instructions comprising:
computer program instructions to, in response to a first container requesting access to a first file not cached by the first container, check whether a second file equivalent to the first file is shared in a memory of the host by a second container, wherein the checking is based on a record in which related information of at least one shared file is stored;
computer program instructions to, in response to the checking indicating there is no second file,
allocate in the memory at least one page for the first file;
load the first file into the at least one page; and
store related information of the first file into the record; and
computer program instructions to, in response to the checking indicating there is the second file,
access a plurality of pages of the second file in the memory to fulfill the accessing attempt for the first file, wherein the plurality of pages of the second file are found in the memory by looking up a respective plurality of addresses of the pages in the record.

9. The system of claim 8, wherein the related information of the at least one shared file includes an image ID of a source image of the shared file, a file path of the shared file, and information used to address at least one page of the shared file in the memory.

10. The system of claim 9, wherein the checking further comprises:
determining that the second file is equivalent to the first file when the first container and the second container are created from the same image, and the first file and the second file have the same file path.

11. The system of claim 9, wherein the checking further comprises:
determining that the second file is equivalent to the first file when the first container and the second container are created from two different images, the first file and the second file come from the two different images respectively, and the first file and the second file are in the same layer of respective images and have the same file path.

12. The system of claim 9, wherein the checking further comprises:
determining that the second file is equivalent to the first file when the first container and the second container are created from two different images, the first file and the second file come from the two different images respectively, and the first file and the second file have the same file content.

13. The system of claim 8, further comprising a set of computer program instructions stored in the memory and executed by at least one of the processors in order to perform action of:
determining that the first file and the second file have not been modified in respective containers before the checking.

14. The system of claim 8, wherein the first container and the second container use separate file systems.

15. A computer program product for page sharing among a plurality of containers running on a host, the computer program product comprising a computer readable storage medium having program instructions embodied therewith, wherein the program instructions being executable by a device configure the device to be operable to perform actions of:
in response to a first container requesting access to a first file not cached by the first container,
checking whether a second file equivalent to the first file is shared in a memory of the host by a second container, wherein the checking is based on a record in which related information of at least one shared file is stored;
in response to the checking indicating there is no second file,
allocating in the memory at least one page for the first file;
loading the first file into the at least one page; and
storing related information of the first file into the record; and
in response to the checking indicating there is the second file,
accessing a plurality of pages of the second file in the memory to fulfill the accessing attempt for the first file, wherein the plurality of pages of the second file are found in the memory by looking up a respective plurality of addresses of the pages in the record.

16. The computer program product of claim 15, wherein the related information of the at least one shared file includes an image ID of a source image of the shared file, a file path of the shared file, and information used to address at least one page of the shared file in the memory.

17. The computer program product of claim 16, wherein the checking further comprises:
determining that the second file is equivalent to the first file when the first container and the second container are created from the same image, and the first file and the second file have the same file path.

18. The computer program product of claim 16, wherein the checking further comprises:
determining that the second file is equivalent to the first file when the first container and the second container are created from two different images, the first file and the second file come from the two different images respectively, and the first file and the second file are in the same layer of respective images and have the same file path.

19. The computer program product of claim 16, wherein the checking further comprises:
determining that the second file is equivalent to the first file when the first container and the second container are created from two different images, the first file and the second file come from the two different images respectively, and the first file and the second file have the same file content.

20. The computer program product of claim 15, wherein the computer readable storage medium further comprising program instructions that are executable by the device to cause the device to perform action of:

determining that the first file and the second file have not been modified in respective containers before the checking.

* * * * *